US011241796B2

(12) United States Patent
Sato et al.

(10) Patent No.: US 11,241,796 B2
(45) Date of Patent: Feb. 8, 2022

(54) ROBOT SYSTEM AND METHOD FOR CONTROLLING ROBOT SYSTEM

(71) Applicant: KABUSHIKI KAISHA YASKAWA DENKI, Kitakyushu (JP)

(72) Inventors: Yuichi Sato, Kitakyushu (JP); Tomoyuki Horiuchi, Kitakyushu (JP); Dai Kono, Kitakyushu (JP); Tetsuro Izumi, Kitakyushu (JP)

(73) Assignee: KABUSHIKI KAISHA YASKAWA DENKI, Kitakyushu (JP)

(*) Notice: Subject to any disclaimer, the term of this patent is extended or adjusted under 35 U.S.C. 154(b) by 390 days.

(21) Appl. No.: 16/197,364

(22) Filed: Nov. 21, 2018

(65) Prior Publication Data
US 2019/0160682 A1 May 30, 2019

(30) Foreign Application Priority Data

Nov. 24, 2017 (JP) .............................. JP2017-225631

(51) Int. Cl.
*B25J 9/16* (2006.01)

(52) U.S. Cl.
CPC ............. *B25J 9/1697* (2013.01); *B25J 9/162* (2013.01); *B25J 9/1664* (2013.01)

(58) Field of Classification Search
CPC ........ B25J 9/1697; B25J 9/162; B25J 9/1664; B25J 9/1666; B25J 5/00; B25J 5/007; B25J 5/02
See application file for complete search history.

(56) References Cited

U.S. PATENT DOCUMENTS

| 6,278,906 | B1* | 8/2001 | Piepmeier | B25J 9/1607 |
| | | | | 700/245 |
| 2006/0072988 | A1* | 4/2006 | Hariki | B25J 9/0096 |
| | | | | 414/282 |
| 2014/0074291 | A1 | 3/2014 | Emoto et al. | |
| 2015/0352721 | A1* | 12/2015 | Wicks | B25J 9/1664 |
| | | | | 700/228 |
| 2017/0173795 | A1* | 6/2017 | Tan | B25J 9/1612 |

FOREIGN PATENT DOCUMENTS

| JP | 60-217085 | 10/1985 |
| JP | 11-058273 | 3/1999 |
| JP | 2003-305676 | 10/2003 |
| WO | WO 2012/153629 | 11/2012 |

OTHER PUBLICATIONS

Japanese Office Action for corresponding JR Application No. 2017-225631, dated Jun. 15, 2021 (w/ English machine translation).

* cited by examiner

*Primary Examiner* — Khoi H Tran
*Assistant Examiner* — Nhi Q Bui
(74) *Attorney, Agent, or Firm* — Mori & Ward, LLP

(57) ABSTRACT

A robot system includes a robot, a first movable object on which the robot is mounted and which is configured to move with the robot, a camera mounted on the first movable object to take, while the first movable object is moving, a plurality of images of a reference object that relates to a position of a workpiece, and circuitry configured to control the robot to operate on the workpiece based on the plurality of images while the first movable object is moving.

20 Claims, 8 Drawing Sheets

ROBOT SYSTEM AND METHOD FOR CONTROLLING ROBOT SYSTEM

CROSS-REFERENCE TO RELATED APPLICATIONS

The present application claims priority under 35 U.S.C. § 119 to Japanese Patent Application No. 2017-225631, filed Nov. 24, 2017. The contents of this application are incorporated herein by reference in their entirety.

BACKGROUND

Field of the Invention

The embodiments disclosed herein relate to a robot system and a method for controlling a robot system.

Discussion of the Background

JP 11-58273A discloses a moving robot apparatus. To work on a workpiece, the moving robot apparatus stops an unmanned conveyance vehicle at a predetermined teaching position, and with the unmanned conveyance vehicle kept stationary at the predetermined teaching position, the moving robot apparatus controls a robot mounted on the unmanned conveyance vehicle to make the robot take a position and a posture that have been taught in advance. Taking the position and the posture, the robot works on the workpiece located at a stationary position. The moving robot apparatus includes image taking means mounted on the leading end of the robot. The image taking means detects a position error of a reference point position on the stationary position. With the unmanned conveyance vehicle kept stationary at a predetermined teaching position, the moving robot apparatus corrects the work position of the robot relative to the workpiece based on the position error detected by the image taking means.

SUMMARY

According to one aspect of the present disclosure, a robot system includes a robot, a first movable object on which the robot is mounted and which is configured to move with the robot, a camera mounted on the first movable object to take, while the first movable object is moving, a plurality of images of a reference object that relates to a position of a workpiece, and circuitry configured to control the robot to operate on the workpiece based on the plurality of images while the first movable object is moving.

According to another aspect of the present disclosure, a method for controlling a robot system includes moving a first movable object on which a robot and a camera are mounted, taking, with the camera, a plurality of images of a reference object that relates to a position of a workpiece while the first movable object is moving, and controlling the robot to operate on the workpiece based on the plurality of images while the first movable object is moving.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

The embodiments will now be described with reference to the accompanying drawings, wherein like reference numerals designate corresponding or identical elements throughout the various drawings.

1. General Arrangement of Robot System

By referring to FIG. 1, an example of a general arrangement of a robot system 1 according to the embodiment will be described.

The robot system 1 is capable of performing predetermined work while causing a movable object 20 to move a robot 10. As illustrated in FIG. 1, the robot system 1 includes the robot 10, the movable object 20 (which is a non-limiting example of the first movable object recited in the appended claims), a camera 3, a camera controller 35, and a robot controller 15 (which is a non-limiting example of the robot controller recited in the appended claims). The robot 10 performs predetermined work on a workpiece W (see FIGS. 4A, 4B, 4C, 5A, 5B, and 5C, described later). The movable object 20 is movable with the robot 10 mounted on the movable object 20.

A non-limiting example of the robot 10 is a vertical multi-articular six-axis robot, having six joints. At the leading end of the robot 10, a hand 7 is mounted. The hand 7 is an end effector. The robot controller 15 is mounted on a base 101 of the robot 10, and controls the robot 10. It is to be noted that the robot 10 may be other than a six-axis robot (examples including, but are not limited to, a five-axis robot and a seven-axis robot). Also, the robot 10 may be other than a vertical multi-articular robot, examples including, but are not limited to, a horizontal multi-articular robot and a parallel link robot. Also, the robot controller 15 may be located at a position separate from the robot 10.

Figure 4A:
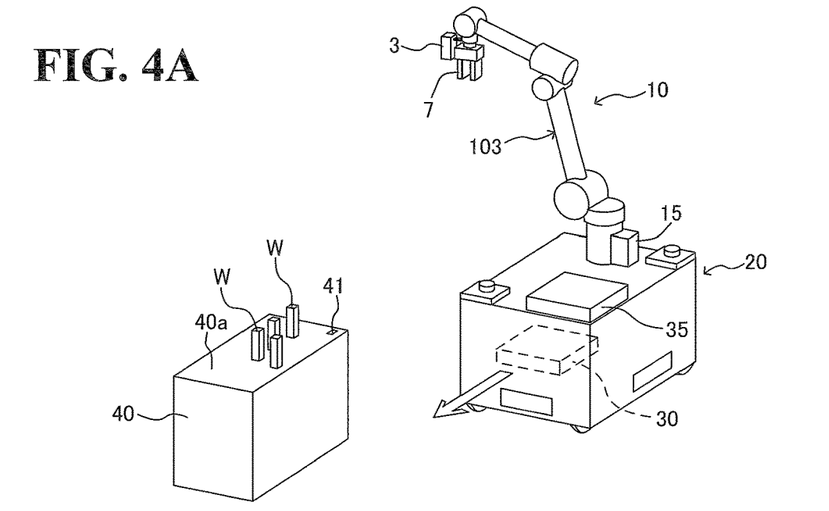
FIG. 4A illustrates an example motion of the robot system in a workpiece picking-up step.
Figure 5A:
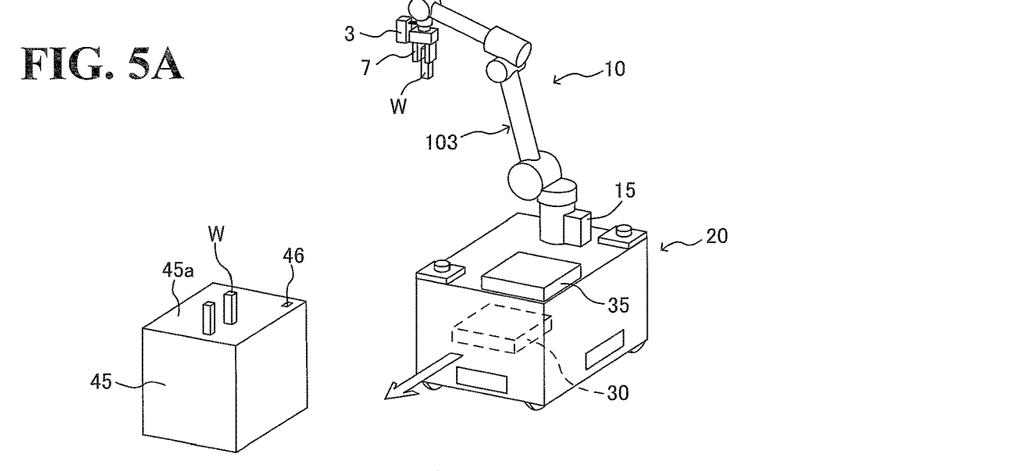
FIG. 5A illustrates an example motion of the robot system in a workpiece placement step.

An example of the predetermined work performed by the robot 10 is to hold, using the hand 7, the workpiece W on a transfer source table 40 (see FIG. 4, described later) and transfers the workpiece W to a transfer destination table 45 (see FIG. 5, described later). It is to be noted that the predetermined work performed by the robot 10 will not be limited to this workpiece transfer work, other examples including, but not limited to, parts assembly work including fitting the workpiece W with another workpiece. Also, it is possible to replace the hand 7 with another end effector suitable for other work such as coating, riveting, nailing, spot welding, stapling, and bolt tightening.

The camera 3 detects a three-dimensional position of the workpiece W in a real-time manner when the robot 10 performs the predetermined work. For this purpose, the camera 3 is disposed at a wrist 106 of the robot 10 with such a posture that the leading end of the hand 7 is included within the field of vision of the camera 3. It is to be noted that the camera 3 may be mounted on another portion of the robot 10 or may be mounted on the movable object 20. Also, the number of cameras 3 will not be limited to one but may be two or more. At the time of the workpiece transfer work by the robot 10, the camera 3 takes an image of a mark 41 (see FIG. 4, described later) on the transfer source table 40 with the movable object 20 moving, and/or takes an image of a mark 46 (see FIG. 5, described later) on the transfer destination table 45 with the movable object 20 moving. It is to be noted that the camera 3 may take images continuously or intermittently in terms of time. In this embodiment, the camera 3 takes images continuously. The camera 3 is connected to the camera controller 35, which is mounted on the movable object 20, so that image information obtained by the camera 3 is transmitted to the camera controller 35.

2. Configuration of Movable Object

An example configuration of the movable object 20 will be described. For convenience of description of a configuration of the movable object 20 and related elements, direction-indicating terms such as "up", "down", "right", "left", "front", and "rear" are occasionally used in the following description. These direction-indicating terms, however, are not intended as limiting relative positions of the movable object 20 and related elements. Also, the directions indicated by the terms "front" and "rear" respectively correspond to the progress direction and the regress direction of the movable object 20.

The movable object 20 is an unmanned conveyance vehicle (AGV, automated guided vehicle) and is tracklessly movable about, for example, factories, plants, and other industrial facilities under the control of a movable object controller 30. As illustrated in FIG. 1, the movable object 20 includes a rectangular parallelepiped housing 21. In the housing 21, the movable object controller 30 is contained. On the upper surface, 21a, of the housing 21, the robot 10 and the camera controller 35 are mounted. The robot 10 is located at a rear position on the upper surface 21a. The camera controller 35 is located at a front-right position on the upper surface 21a. Wheels 22 are located at four corners of the lower surface of the housing 21. Omni-directional sensors 23 are located at two corners of the upper surface 21a of the housing 21 that are aligned on a diagonal line (specifically, the front-left corner and the rear-right corner in this embodiment). A proximity sensor 24 is located at the front surface, 21b, of the housing 21. A map making sensor 25 is located at the right surface or the left surface of the housing 21. In this embodiment, the map making sensor 25 is located at the right surface, 21c.

The movable object 20 includes at least one motor (not illustrated). The motor is controlled by the movable object controller 30 to drive the wheels 22, causing the movable object 20 to move together with the robot 10, which is mounted on the movable object 20. With the movable object 20 moving, the two omni-directional sensors 23 measure a 360-degree (°) environment of the movable object 20 using laser. Thus, the two omni-directional sensors 23 are used to check a situation surrounding the movable object 20. With the movable object 20 moving, the proximity sensor 24 measures the distance from the movable object 20 to an object using ultrasonic. Thus, the proximity sensor 24 is used to avoid a collision with an object. With the movable object 20 moving, the map making sensor 25 measures an environment around the movable object 20 using laser to make an environment map of the surrounding of the movable object 20. These sensors improve safety of the robot system 1, facilitating a cooperation of the robot system 1 and human beings (workers).

It is to be noted that the above-described configuration of the movable object 20 is provided for example purposes only and is not intended in a limiting sense. Another possible example is that at least one of the omni-directional sensors 23, the proximity sensor 24, and the map making sensor 25 is not provided. Also, the movable object 20 will not be limited to a vehicle but may be an unmanned aircraft or any other device movable with the robot 10 on.

3. Configuration of Robot

An example configuration of the robot 10 will be described.

Figure 1:
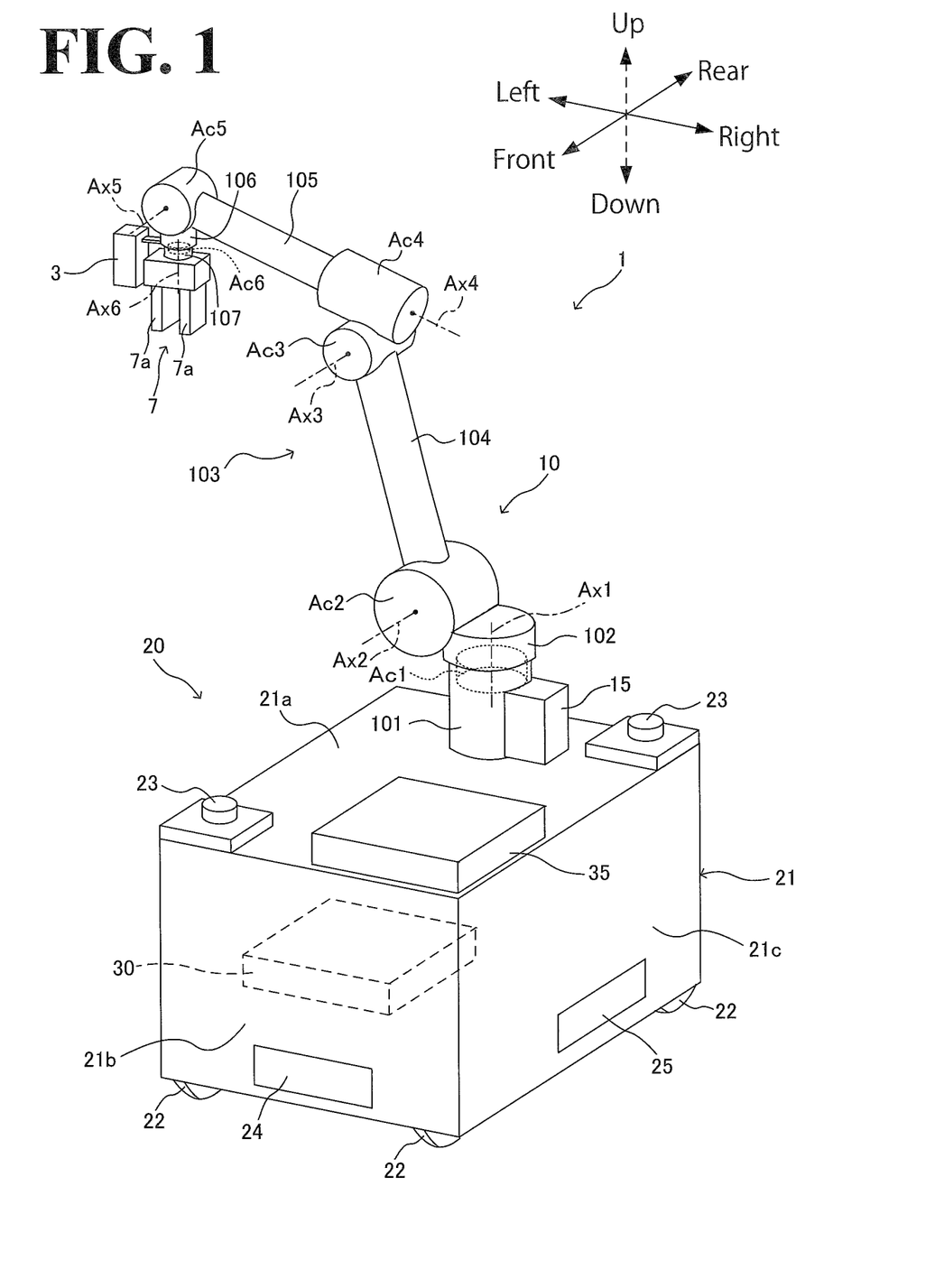
FIG. 1 illustrates an example general arrangement of a robot system according to an embodiment.

As illustrated in FIG. 1, the robot 10 includes the base 101, a turnable portion 102, and an aim 103. The base 101 is fixed to the upper surface 21a of the movable object 20.

The turnable portion 102 is supported by the upper end of the base 101 turnably about rotation axis center Ax1, which is approximately parallel to the upward and downward directions. The turnable portion 102 is driven by an actuator Ac1, which is located at the joint between the turnable portion 102 and the base 101, to make a turning motion about the rotation axis center Ax1 relative to the upper end of the base 101.

The arm 103 is supported by one side portion of the turnable portion 102. The atm 103 includes a lower arm 104, an upper arm 105, the wrist 106, and a flange 107.

The lower arm 104 is supported by the one side portion of the turnable portion 102 turnably about rotation axis center Ax2, which is approximately perpendicular to the rotation axis center Ax1. The lower arm 104 is driven by an actuator Ac2, which is located at the joint between the lower arm 104 and the turnable portion 102, to make a turning motion about the rotation axis center Ax2 relative to the one side portion of the turnable portion 102.

The upper arm 105 is supported by the leading end of the lower arm 104 turnably about rotation axis center Ax3, which is approximately parallel to the rotation axis center Ax2. The upper arm 105 is also rotationally movable about rotation axis center Ax4, which is approximately perpendicular to the rotation axis center Ax3. The upper arm 105 is driven by an actuator Ac3, which is located at the joint between the upper arm 105 and the lower arm 104, to make a turning motion about the rotation axis center Ax3 relative to the leading end of the lower arm 104. The upper arm 105 is also driven by an actuator Ac4, which is located between the upper arm 105 and the actuator Ac3, to rotationally move about the rotation axis center Ax4 relative to the leading end of the lower arm 104.

The wrist 106 is supported by the leading end of the upper atm 105 turnably about rotation axis center Ax5, which is approximately perpendicular to the rotation axis center Ax4. The wrist 106 is driven by an actuator Ac5, which is located at the joint between the wrist 106 and the upper arm 105, to make a turning motion about the rotation axis center Ax5 relative to the leading end of the upper arm 105.

The flange 107 is supported by the leading end of the wrist 106 rotationally movably about rotation axis center Ax6, which is approximately perpendicular to the rotation axis center Ax5. The flange 107 is driven by an actuator Ac6, which is located at the joint between the flange 107 and the wrist 106, to rotationally move about the rotation axis center Ax6 relative to the leading end of the wrist 106.

The hand 7 is mounted on the leading end of the flange 107 and rotationally movable about the rotation axis center Ax6 along with the rotational movement of the flange 107 about the rotation axis center Ax6. The hand 7 includes a pair of claws 7a and 7a. The pair of claws 7a and 7a are movable toward and away from each other. The hand 7 is capable of making various manipulations such as holding the workpiece W between the claws 7a and 7a.

With the above-described configuration, the robot 10 is a six-axis robot, having six joints, with the six actuators Ac1 to Ac6 at the joints. The actuators Ac1 to Ac6, which drive the respective joints, each include a servo motor, a reducer, and a brake. It is to be noted that the servo motor, the reducer, and the brake may not necessarily be arranged on the rotation axis centers Ax1 to Ax6 but may be disposed at a distance from the rotation axis centers Ax1 to Ax6.

It is to be noted that in the above description, the rotation about a rotation axis center extending in the longitudinal direction (or extending direction) of the aim 103 is referred to as "rotational movement", whereas the rotation about a rotation axis center extending approximately perpendicularly to the longitudinal direction of the arm 103 is referred to as "turning".

Figure 2:
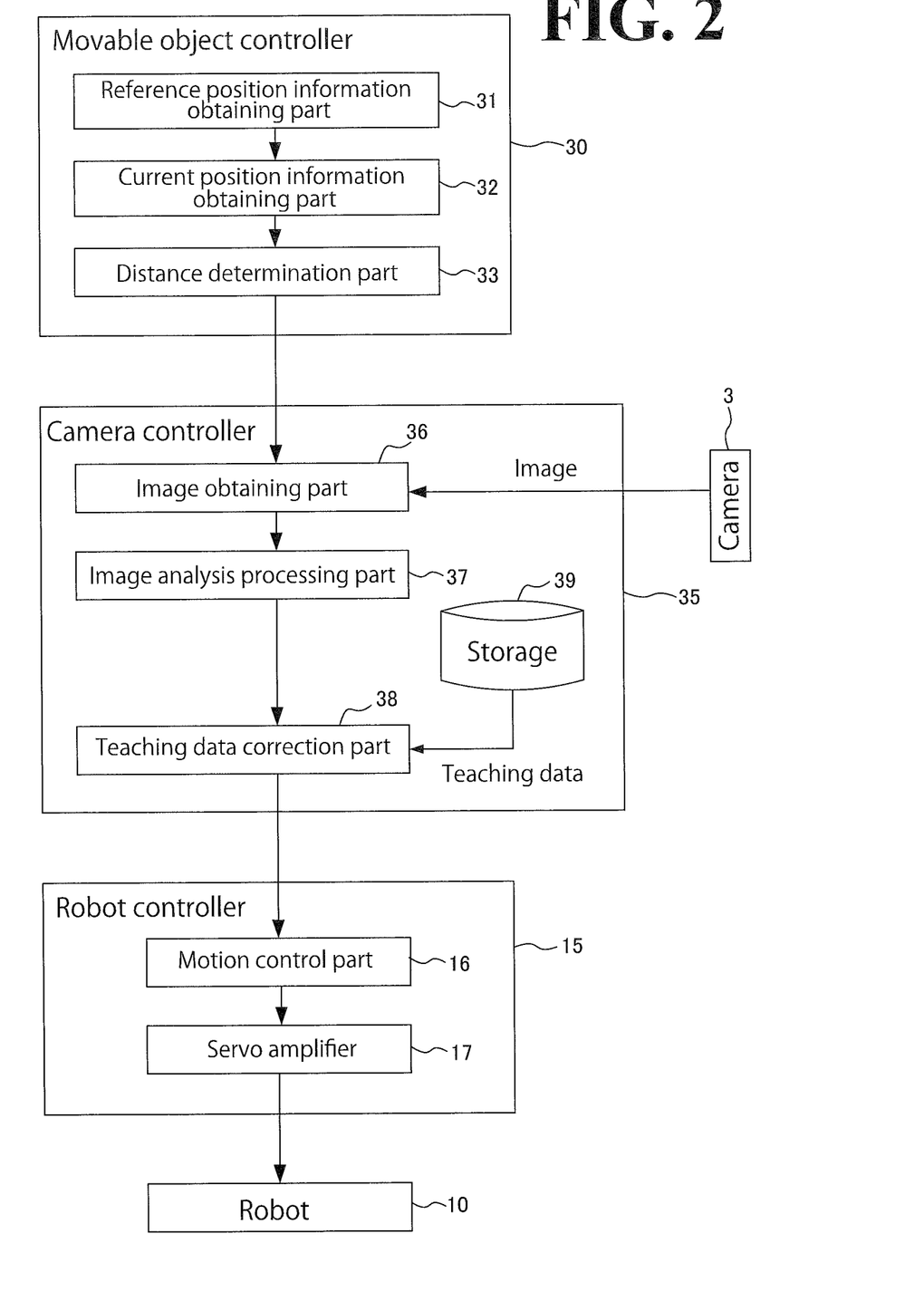
FIG. 2 is a block diagram illustrating an example functional configuration of a movable object controller of a robot system, an example functional configuration of a camera controller of the robot system, and an example functional configuration of a robot controller of the robot system.

4. Functional Configurations of Movable Object Controller, Camera Controller, and Robot Controller By referring to FIG. 2, example functional configurations of the movable object controller 30, the camera controller 35, and the robot controller 15 will be described. In FIG. 2, the function configuration associated with control of movement of the movable object 20 is omitted from the functional configuration of the movable object controller 30.

The movable object controller 30 includes a programmable logic controller (PLC) and a personal computer (PC). The movable object controller 30 includes a reference position information obtaining part 31, a current position information obtaining part 32, and a distance determination part 33.

The reference position information obtaining part 31 obtains reference position information. The reference position information is position information regarding the position of the mark 41, which is located on the transfer source table 40, and the position of the mark 46, which is located on the transfer destination table 45. The mark 41 and the mark 46 serve as reference positions when the robot 10 performs the workpiece transfer work. The reference position information may be obtained from any convenient recording means of the movable object controller 30 (such as memory and hard disc), or may be obtained through communication with an instrument (such as an upper-level controller) external to the robot system 1.

The current position information obtaining part 32 obtains current position information of the movable object 20 on the move. The current position information may be calculated based on, for example, travel information of the movable object 20 or map information made by the map making sensor 25. Alternatively, the current position information may be obtained through communication with an instrument (such as a positioning device) external to the robot system 1.

Based on the obtained reference position information of the marks 41 and 46 and based on the obtained current position information of the movable object 20, the distance determination part 33 determines whether the distance between the movable object 20 and the reference position of the mark 41 or 46 has become equal to or less than a predetermined threshold. In other words, the distance determination part 33 determines whether the movable object 20 is at equal to or less than a predetermined distance from the transfer source table 40 or the transfer destination table 45. Upon determining that the distance has become equal to or less than the predetermined threshold, the distance determination part 33 outputs this determination to the camera controller 35. A non-limiting example of the predetermined threshold is such a distance that the marks 41 and 46 are included within the field of vision of the camera 3.

The camera controller 35 includes a PLC and a PC. The camera controller 35 includes an image obtaining part 36, an image analysis processing part 37, a teaching data correction part 38, and a storage 39.

The image obtaining part 36 receives the determination from the distance determination part 33 of the movable object controller 30 (determination that the distance between the movable object 20 and the mark 41 or the mark 46 has become equal to or less than the predetermined threshold). Receiving the determination triggers the image obtaining part 36 to start obtaining images of the mark 41 or the mark 46 taken by the camera 3. Then, the image obtaining part 36 obtains, continuously in terms of time, images taken by the camera 3 until, for example, the determination part 33 determines that the distance between the movable object 20 and the mark 41 or the mark 46 has become greater than the predetermined threshold. That is, the image obtaining part 36 obtains a large number of images taken by the camera 3 at different timings.

The image analysis processing part 37 performs predetermined image analysis processing on the images obtained by the image obtaining part 36. In this manner, the image analysis processing part 37 measures, in a real-time manner, a three-dimensional position and a three-dimensional posture of the mark 41 or the mark 46 relative to the movable object 20 (the robot 10).

The storage 39 stores teaching data for the robot 10 to perform the predetermined work on the workpiece W. A non-limiting example of the teaching data is prepared such that with the movable object 20 in stationary state, the robot 10 and the mark 41 or 46 are arranged to meet a relative positional relationship that serves as a predetermined reference. The teaching data includes a plurality of teaching data each stored in the storage 39 such that the each teaching data is correlated with a different kind of mark. For example, in this embodiment, the storage 39 stores: a teaching data that is correlated with the mark 41 to cause the robot 10 to pick up the workpiece W from the transfer source table 40; and a teaching data that is correlated with the mark 46 to cause the robot 10 to place the workpiece W on the transfer destination table 45.

The teaching data correction part 38 reads a teaching data from the storage 39 and corrects the teaching data based on the image analysis performed by the image analysis processing part 37. The corrected teaching data is output to the robot controller 15. In this embodiment, since the robot 10 works on the workpiece W while moving, the position of the workpiece W relative to the robot 10 continually or frequently changes. In light of the circumstances, the teaching data correction part 38 corrects the teaching data on a comparatively short-period basis (an example period is operation period of the CPU of the camera controller 35). This enables the robot 10 to perform the predetermined work while making the hand 7 more accurately follow the workpiece W that is moving relative to the moving robot 10.

The robot controller 15 includes a motion control part 16 and a servo amplifier 17. The motion control part 16 receives the teaching data from the teaching data correction part 38. Based on the teaching data, the motion control part 16 calculates target rotational angles and/or other parameters of the servo motors (not illustrated) of the actuators Ac1 to Ac6 of the robot 10. The target rotational angles and/or other parameters correspond to a position of the hand 7 of the robot 10 specified in the teaching data. Then, the motion control part 16 outputs a motor position command corresponding to the target rotational angles and/or other parameters.

The servo amplifier 17 receives the motor position command from the motion control part 16. Based on the motor position command, the servo amplifier 17 controls driving power supplied to the servo motors of the actuators Ac1 to Ac6, thereby controlling motions of the robot 10.

While in the above description the image obtaining part 36 obtains images continuously in terms of time, the image obtaining part 36 may obtain images intermittently. In the intermittent case, the image obtaining part 36 may obtain a plurality of images taken by the camera 3 at different timings (the number of images may be two or more; a larger number means a higher level of accuracy). Then, based on the images, a vector calculation part (not illustrated) of the camera controller 35 may calculate a relative movement velocity vector per unit time of the mark 41 or the mark 46 relative to the movable object 20 (the robot 10). Then, the teaching data correction part 38 may correct the teaching data based on the calculated relative movement velocity vector. This enables the leading end position of the hand 7 to follow the workpiece W to its estimated relative movement destination.

It is to be noted that the processings performed by the distance determination part 33, the teaching data correction part 38, the motion control part 16, and other parts may be performed by a smaller number of processing parts (for example, a single processing part) or by a larger number of processing parts. Also, among the processing parts of the controllers 30, 35, and 15, the part (such as servo amplifier) to supply driving power to the servo motors may be implemented by a tangible device, while the other parts may be implemented by a program executed by CPU 901 (described later by referring to FIG. 8). Alternatively, the processing parts of the controllers 30, 35, and 15 may be partially or entirely implemented by a tangible device or devices such as an application specific integrated circuit (ASIC), a field-programmable gate array (FPGA), and other electric circuits. Examples of the processing parts of the movable object controller 30 include, but are not limited to, the reference position information obtaining part 31, the current position information obtaining part 32, and the distance determination part 33. Examples of the processing parts of the camera controller 35 include, but are not limited to, the image obtaining part 36, the image analysis processing part 37, the teaching data correction part 38, and the storage 39. Examples of the processing parts of the robot controller 15 include, but are not limited to, the motion control part 16 and the servo amplifier 17.

Figure 3:
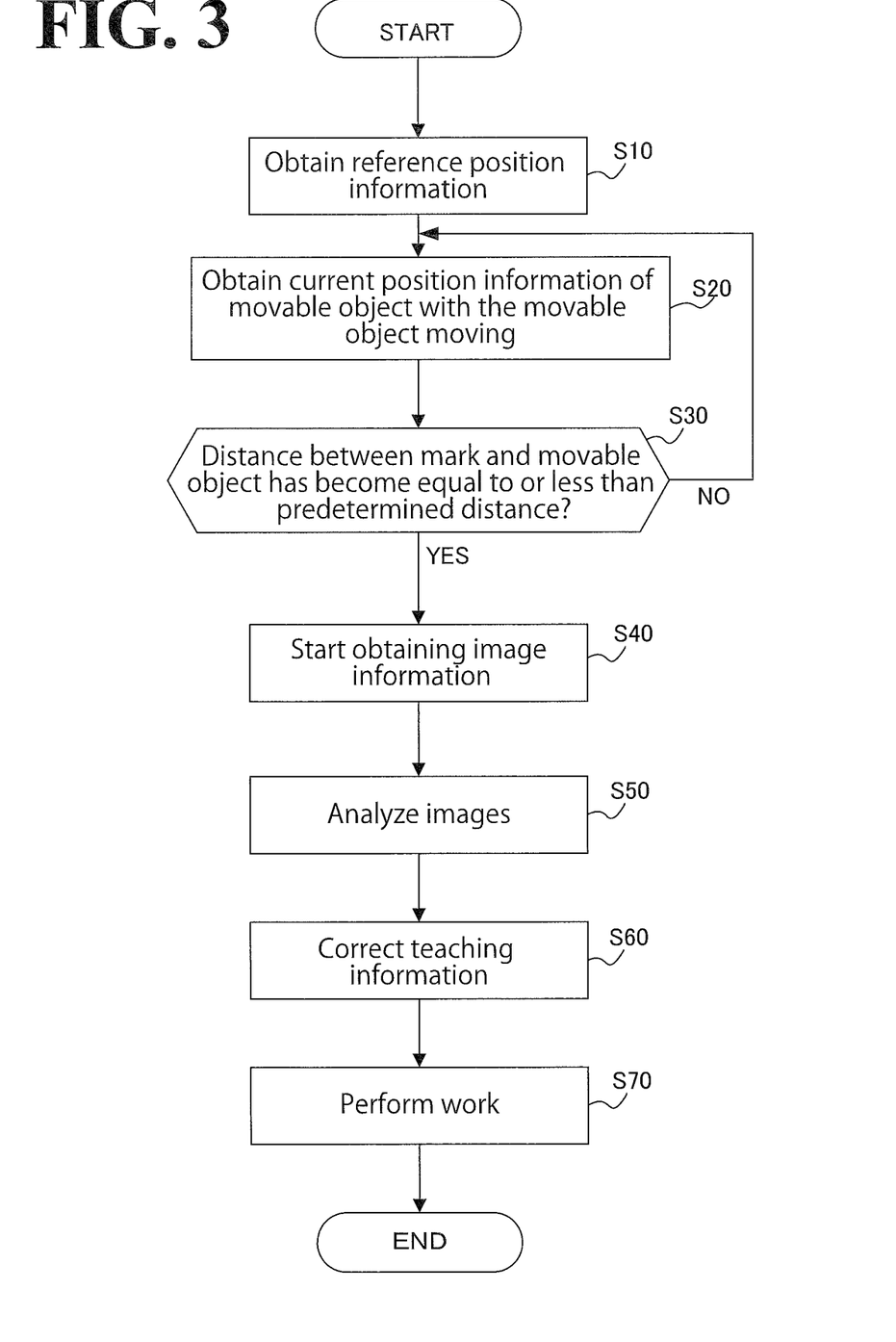
FIG. 3 is a flowchart of example control performed by the movable object controller, the camera controller, and the robot controller at the time of workpiece transfer work.
Figure 4B:
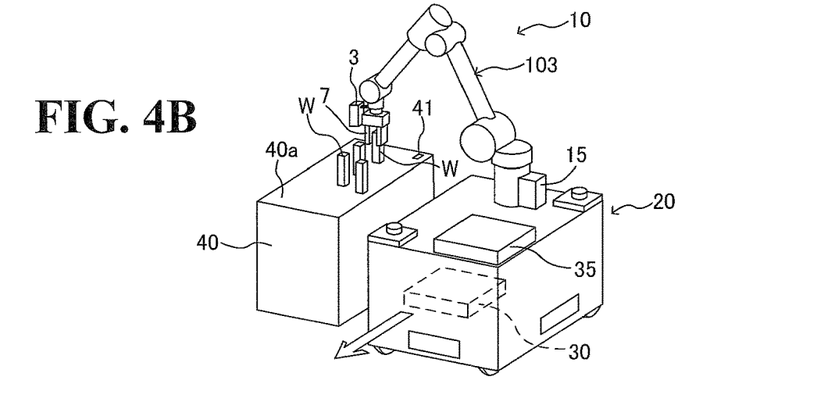
FIG. 4B illustrates an example motion of the robot system in the workpiece picking-up step.
Figure 4C:
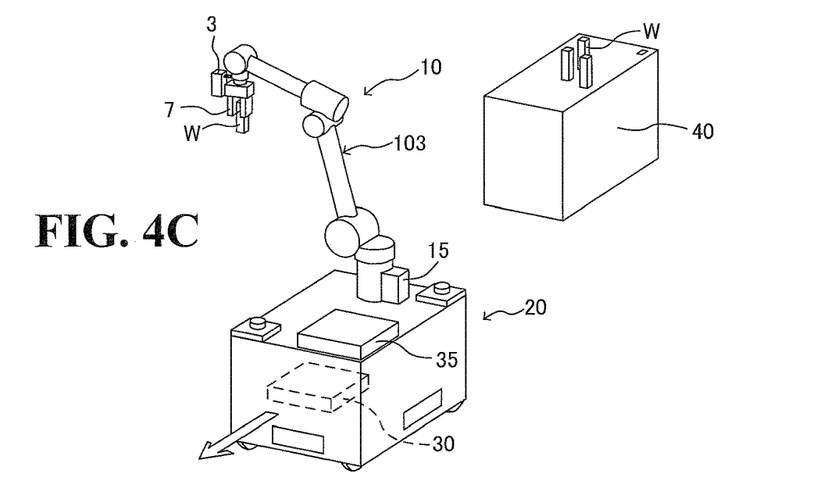
FIG. 4C illustrates an example motion of the robot system in the workpiece picking-up step.
Figure 5B:
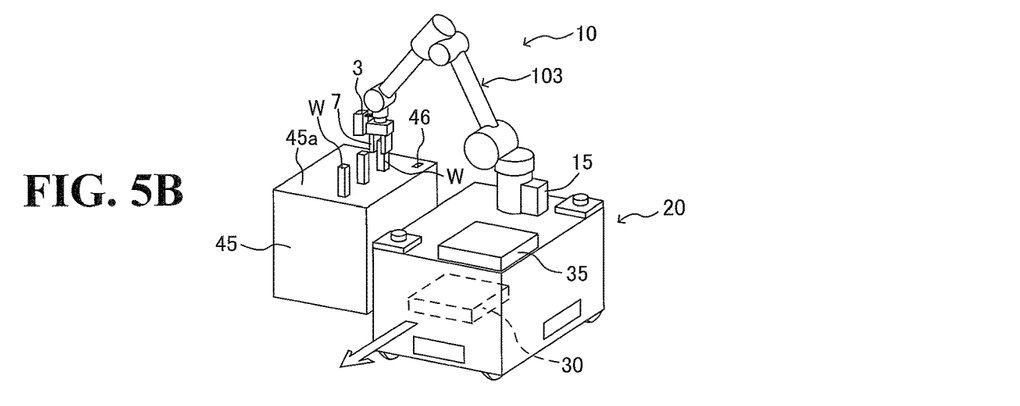
FIG. 5B illustrates an example motion of the robot system in the workpiece placement step.
Figure 5C:
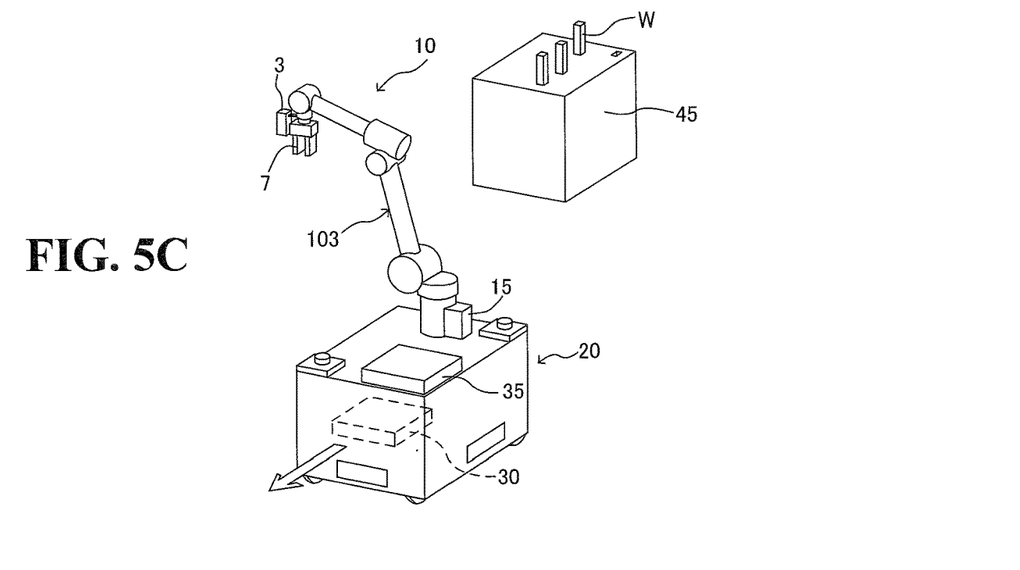
FIG. 5C illustrates an example motion of the robot system in the workpiece placement step.

5. Details of Control Performed by Controllers and Motions of Robot System at Workpiece Transfer Work By referring to FIGS. 3, 4A, 4B, 4C, 5A, 5B, and 5C, description will be made with regard to details of example control performed by the controllers 30, 35, and 15 at the time of workpiece transfer work and with regard to example motions of the robot system 1 at the time of the workpiece transfer work. FIG. 3 is a flowchart of example control performed by the controllers 30, 35, and 15 at the time of the workpiece transfer work. FIGS. 4A to 4C illustrate an example workpiece picking-up motion in the workpiece transfer work. FIGS. 5A to 5C illustrate an example workpiece placement motion in the workpiece transfer work.

As illustrated in FIG. 4A, the transfer source table 40 is used when the robot 10 performs the workpiece transfer work. The mark 41 is located on the upper surface, 40a, of the transfer source table 40 (the mark 41 is a non-limiting example of the reference object recited in the appended claims). The mark 41 serves as a reference position in the workpiece picking-up step. Also, a plurality of workpieces W are placed at predetermined positions on the upper surface 40a. The plurality of workpieces W are work targets. As illustrated in FIG. 5A, the transfer destination table 45 is used when the robot 10 performs the workpiece transfer work. The mark 46 is located on the upper surface, 45a, of the transfer destination table 45 (the mark 46 is a non-limiting example of the reference object recited in the appended claims). The mark 46 serves as a reference position in the workpiece placement step. It is to be noted that the marks 41 and 46 may be any indicators that make reference positions recognizable on the images taken by the camera 3. Examples of the marks 41 and 46 include, but are not limited to, letters, symbols, signs, and patterns. Other examples include: protrusions, depressions, and other shapes on the upper surfaces of the tables; and even the workpieces W themselves.

In the workpiece picking-up step, at step S10, the reference position information obtaining part 31 of the movable object controller 30 obtains reference position information of the mark 41 on the transfer source table 40.

At step S20, the movable object controller 30 controls the movable object 20 to move toward the transfer source table 40, as illustrated in FIG. 4A. Then, the current position information obtaining part 32 of the movable object controller 30 obtains current position information of the movable object 20 on the move.

At step S30, based on the obtained reference position information of the mark 41 and the obtained current position information of the movable object 20, the distance determination part 33 of the movable object controller 30 determines whether the distance between the transfer source table 40 (the mark 41) and the movable object 20 has become equal to or less than the predetermined distance. When the condition at step S30 is not satisfied (step S30: NO), the procedure returns to step S20. When the condition at step S30 is satisfied (step S30: YES), the procedure proceeds to step S40.

At step S40, the image obtaining part 36 of the camera controller 35 starts obtaining images of the mark 41 taken by the camera 3. Then, the image obtaining part 36 obtains the images continuously.

At step S50, the image analysis processing part 37 of the camera controller 35 analyzes the obtained images to measure a relative three-dimensional position and a relative three-dimensional posture of the mark 41 relative to the movable object 20 (the robot 10).

At step S60, the teaching data correction part 38 of the camera controller 35 corrects, based on the image analysis, the teaching data corresponding to the mark 41 read from the storage 39 (teaching data for the work of picking up the workpiece W).

At step S70, the motion control part 16 of the robot controller 15 calculates, based on the corrected teaching data, a position command for the servo motors of the actuators Ac1 to Ac6 of the robot 10. Then, the servo amplifier 17 of the robot controller 15 controls driving power supplied to the servo motors, thereby controlling the robot 10 to perform the workpiece picking-up step in the workpiece transfer work.

Specifically, as illustrated in FIG. 4B, the robot 10 is moved by the movable object 20 and holds a predetermined workpiece W on the transfer source table 40 using the hand 7 of the arm 103. Then, as illustrated in FIG. 4C, the robot 10 holding the workpiece W in the hand 7 is moved by the movable object 20 away from the transfer source table 40. Thus, the workpiece picking-up step in the workpiece transfer work ends.

Upon ending of the workpiece picking-up step, the movable object 20 goes on moving to switch to the workpiece placement step in the workpiece transfer work. The workpiece placement step is performed according to a procedure similar to the procedure for the workpiece picking-up step.

At step S10, the reference position information obtaining part 31 of the movable object controller 30 obtains reference position information of the mark 46 of the transfer destination table 45.

At step S20, the movable object controller 30 controls the movable object 20 to move toward the transfer destination table 45, as illustrated in FIG. 5A. Then, the current position information obtaining part 32 of the movable object controller 30 obtains current position information of the movable object 20 on the move.

At step S30, based on the obtained reference position information of the mark 46 and the obtained current position information of the movable object 20, the distance determination part 33 of the movable object controller 30 determines whether the distance between the transfer source table 45 (the mark 46) and the movable object 20 has become equal to or less than the predetermined distance. When the condition at step S30 is not satisfied (step S30: NO), the procedure returns to step S20. When the condition at step S30 is satisfied (step S30: YES), the procedure proceeds to step S40.

At step S40, the image obtaining part 36 of the camera controller 35 starts obtaining images of the mark 46 taken by the camera 3. Then, the image obtaining part 36 obtains the images continuously.

At step S50, the image analysis processing part 37 of the camera controller 35 analyzes the obtained images to measure a relative three-dimensional position and a relative three-dimensional posture of the mark 46 relative to the movable object 20 (the robot 10).

At step S60, the teaching data correction part 38 of the camera controller 35 corrects, based on the image analysis, the teaching data corresponding to the mark 46 read from the storage 39 (teaching data for the work of placing the workpiece W).

At step S70, the motion control part 16 of the robot controller 15 calculates, based on the corrected teaching data, a position command for the servo motors of the actuators Ac1 to Ac6 of the robot 10. Then, the servo amplifier 17 of the robot controller 15 controls driving power supplied to the servo motors, thereby controlling the robot 10 to perform the workpiece placement step in the workpiece transfer work.

Specifically, as illustrated in FIG. 5B, the robot 10 holding the workpiece W in the hand 7 of the aim 103 is moved by the movable object 20 and places the workpiece W on a predetermined position on the transfer destination table 45. Then, as illustrated in FIG. 5C, after placing the workpiece W, the robot 10 is moved by the movable object 20 away from the transfer destination table 45. Thus, the workpiece placement step in the workpiece transfer work ends. Thus, the workpiece transfer work ends.

6. Advantageous Effects of the Embodiment

As has been described hereinbefore, the robot system 1 according to this embodiment includes the robot 10, the movable object 20, the camera 3, the image obtaining part 36, and the robot controller 15. The robot 10 performs predetermined work on the workpiece W. The movable object 20 moves with the robot 10 mounted on the movable object 20. The camera 3 is mounted on the robot 10. The camera 3 takes at least two images of the mark 41 at different timings with the movable object 20 moving, and takes at least two images of the mark 46 at different timings with the movable object 20 moving. The image obtaining part 36 obtains the at least two images. Based on the at least two images, the robot controller 15 controls the robot 10 to perform the predetermined work with the movable object 20 moving. This configuration provides advantageous effects, some of which are described below.

With the robot system 1 according to this embodiment, the camera 3 takes at least two images of the mark 41 at different timings while the movable object 20 is moving, and takes at least two images of the mark 46 at different timings while the movable object 20 is moving. The at least two images can be used to measure a relative three-dimensional position and a relative three-dimensional posture of the mark 41 relative to the movable object 20 (the robot 10), and a relative three-dimensional position and a relative three-dimensional posture of the mark 46 relative to the movable object 20. Therefore, by controlling motions of the robot 10 based on the at least two images, the robot 10 is able to perform the predetermined work on the workpiece W while moving together with the movable object 20. This ensures a significant reduction in cycle time of a work process as compared with the case where the movable object stops so that the robot takes images of the mark and performs predetermined work on the workpiece with the movable object kept in stationary state. As a result, the embodiment ensures a significant reduction in time. Also, since the robot 10 is a mobile robot, the work position of the robot 10 is easily changeable, resulting in improved robustness (flexibility) of the corresponding work process.

Also in this embodiment, the robot system 1 includes the reference position information obtaining part 31, the current position information obtaining part 32, and the distance determination part 33. The reference position information obtaining part 31 obtains reference position information of the marks 41 and 46. The current position information obtaining part 32 obtains current position information of the movable object 20. Based on the reference position information and the current position information, the distance determination part 33 determines whether the distance between the reference position and the movable object 20 is equal to or less than a predetermined threshold or greater than the predetermined threshold. When the distance determination part 33 has determined that the distance is equal to or less than the predetermined threshold, the image obtaining part 36 obtains the at least two images of the mark 41 or 46 taken by the camera 3. This configuration provides advantageous effects, some of which are described below.

In this embodiment, the movable object 20 moves toward the mark 41 or the mark 46, and when the distance between the movable object 20 and the mark 41 or the mark 46 has become equal to or less than the predetermined threshold, the at least two images of the mark 41 or the mark 46 taken by the camera 3 are obtained. Thus, no images are obtained when the mark 41 or the mark 46 is too far away from the movable object 20. This reduces the load involved in image processing. It is when the mark 41 or the mark 46 and the movable object 20 are close enough to each other that the at least two images are obtained. This enables the at least two images to be taken more reliably and makes the at least two images more reliable.

Also in this embodiment, the robot system 1 includes the teaching data correction part 38. Based on an analysis of the at least two images, the teaching data correction part 38 corrects the teaching data that is for the robot 10 to perform the predetermined work. The robot controller 15 controls the robot 10 based on the corrected teaching data. This configuration provides advantageous effects, some of which are described below.

In this embodiment, the storage 39 stores, in advance, the teaching data that is for the robot 10 to perform the predetermined work on the workpiece W. The teaching data is corrected based on the analysis of the at least two images. This enables the leading end position of the hand 7 to follow the workpiece W to its relative movement destination. This, in turn, enables the robot 10 to move and perform the predetermined work on the workpiece W at the same time while eliminating or minimizing degradation of the accuracy of the predetermined work.

Also in this embodiment, the robot system 1 includes a vector calculation part that calculates, based on the at least two images, a relative movement velocity vector per unit time of the mark 41 relative to the movable object 20 and a relative movement velocity vector per unit time of the mark 46 relative to the movable object 20. Based on the relative movement velocity vector, the teaching data correction part 38 corrects the teaching data that is for the robot 10 to perform the workpiece transfer work. This configuration provides advantageous effects, some of which are described below.

By calculating a relative movement velocity vector of the mark 41 and a relative movement velocity vector of the mark 46, relative movement destinations of the marks 41 and 46 relative to the robot 10 can be estimated. By correcting the teaching data based on the relative movement velocity vector, the leading end position of the hand 7 is enabled to follow the workpiece W to its estimated relative movement destination. This enables the robot 10 to move and perform the predetermined work on the workpiece W at the same time while eliminating or minimizing degradation of the accuracy of the predetermined work.

Also in this embodiment, the image obtaining part 36 continuously obtains the at least two images of the mark 41 with the movable object 20 moving, and continuously obtains the at least two images of the mark 46 with the movable object 20 moving.

This increases the accuracy with which the teaching data is corrected, minimizing the influence of external disturbance, apart from the influence of relative velocity. Examples of external disturbance include depressions and protrusions on a ground surface, slipping of the wheels 22 of the movable object 20, and a mechanical rattling movement.

7. Modifications

In the above-described embodiment, the transfer source table 40 and the transfer destination table 45 with the workpiece W on are stationary. This, however, is not intended in a limiting sense. Another possible example is that the workpiece W is placed on a movable object so that the robot 10 performs predetermined work on the workpiece W while both the robot 10 and the workpiece W are moving.

Figure 6A:
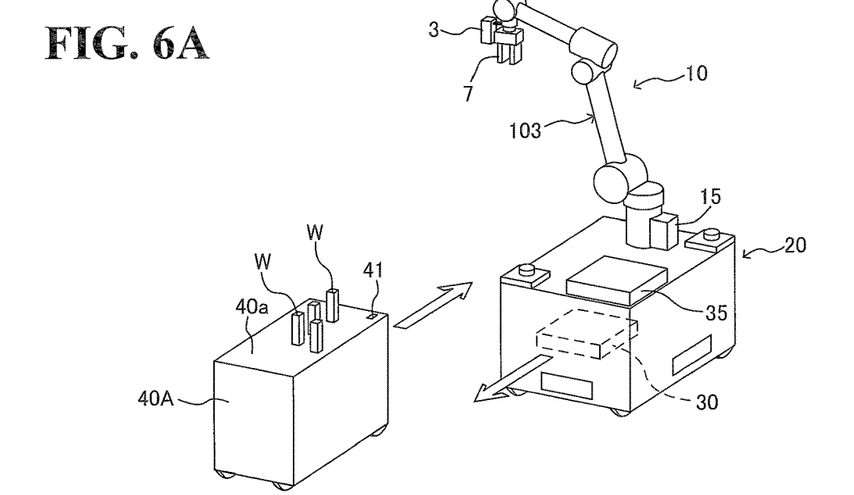
FIG. 6A illustrates an example motion of the robot system in the workpiece picking-up step in a modification in which both a workpiece and a robot move.
Figure 6B:
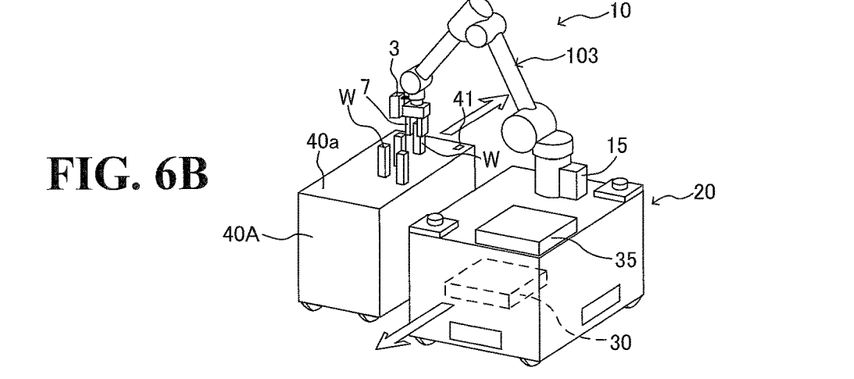
FIG. 6B illustrates an example motion of the robot system in the workpiece picking-up step in the modification in which both the workpiece and the robot move.
Figure 6C:
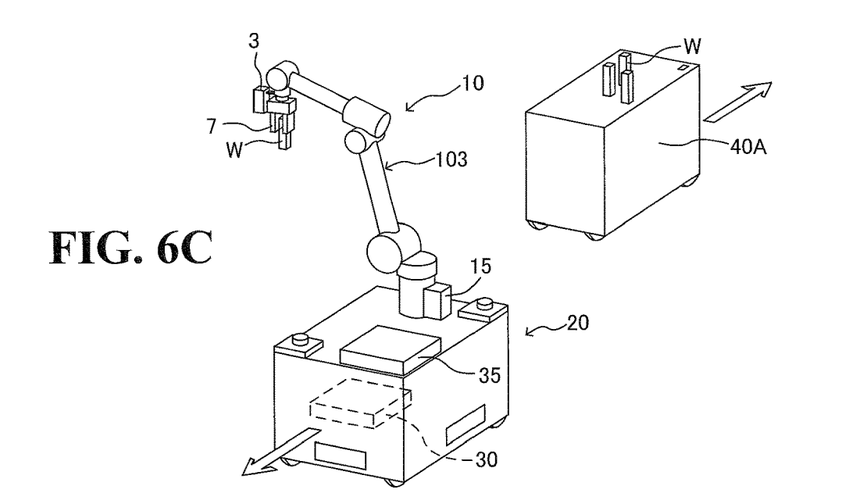
FIG. 6C illustrates an example motion of the robot system in the workpiece picking-up step in the modification in which both the workpiece and the robot move.

This example is illustrated in FIGS. 6A to 6C, where a movable object 40A (which is a non-limiting example of the second movable object recited in the appended claims) serves as a transfer source table for the workpiece W. While the robot 10 is moving together with the movable object 20 and the workpiece W is moving in the opposite direction together with the movable object 40A, the robot 10 performs the workpiece picking-up step.

Figure 7A:
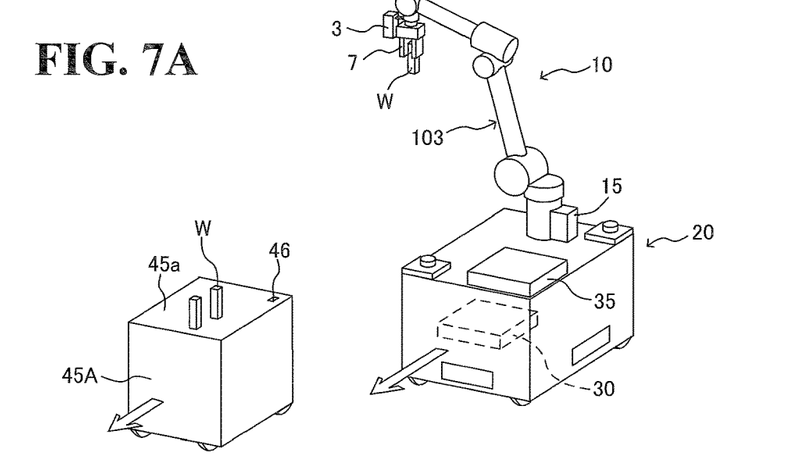
FIG. 7A illustrates an example motion of the robot system in the workpiece placement step in the modification in which both the workpiece and the robot move.
Figure 7B:
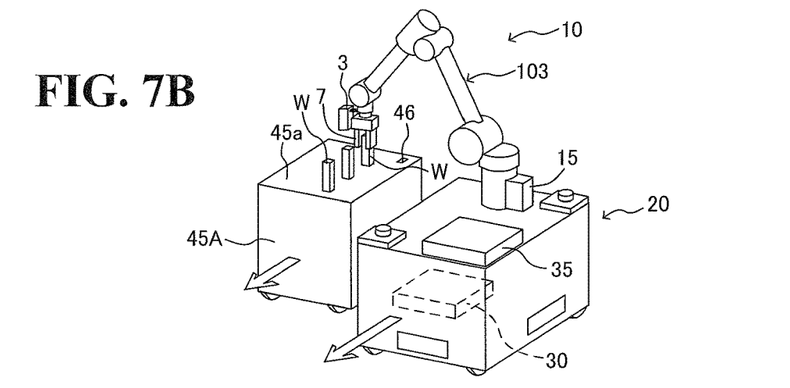
FIG. 7B illustrates an example motion of the robot system in the workpiece placement step in the modification in which both the workpiece and the robot move.
Figure 7C:
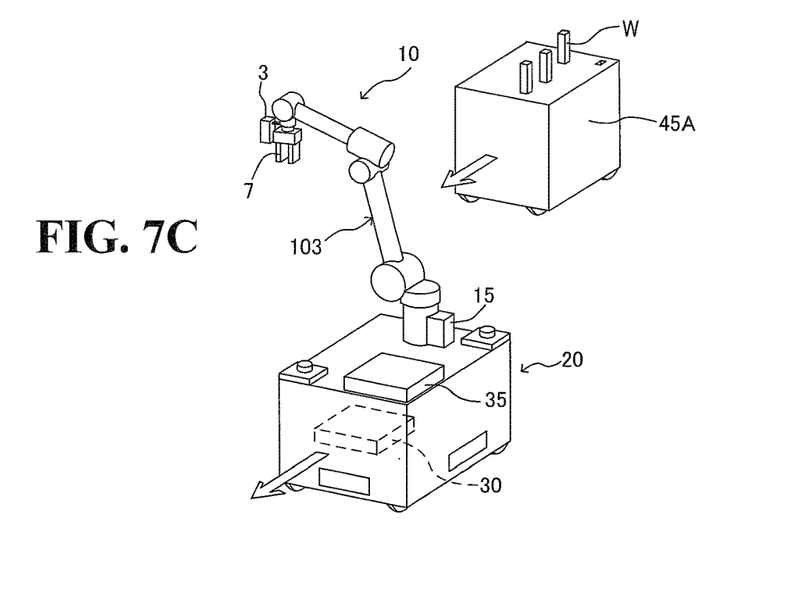
FIG. 7C illustrates an example motion of the robot system in the workpiece placement step in the modification in which both the workpiece and the robot move.

Another example is illustrated in FIGS. 7A to 7C, where a movable object 45A (which is a non-limiting example of the second movable object recited in the appended claims) serves as a transfer destination table for the workpiece W. While the robot 10 is moving together with the movable object 20 and the workpiece W is moving in the same direction together with the movable object 45A, the robot 10 performs the workpiece placement step. It is to be noted that in this example, the movable object 45A moves at a speed lower than the speed of movement of the movable object 20.

In these modifications, the control performed by the controllers is approximately the same as the control performed in the above-described embodiment, and will not be elaborated upon here.

In these modifications, the robot 10 is able to move and perform the predetermined work on the moving workpiece W at the same time. Specifically, the robot 10 is able to perform work such as machining and assembly on the workpiece W while the workpiece W is being transferred, resulting in an additional reduction in time. Also, since the robot 10 is a mobile robot, the work position of the robot 10 and/or the transfer passage of the workpiece W are freely changeable, resulting in improved robustness (flexibility) of the corresponding work process.

8. Example Hardware Configuration of Controller

By referring to FIG. 8, an example hardware configuration of the robot controller 15, the movable object controller 30, and the camera controller 35 will be described.

Figure 8:
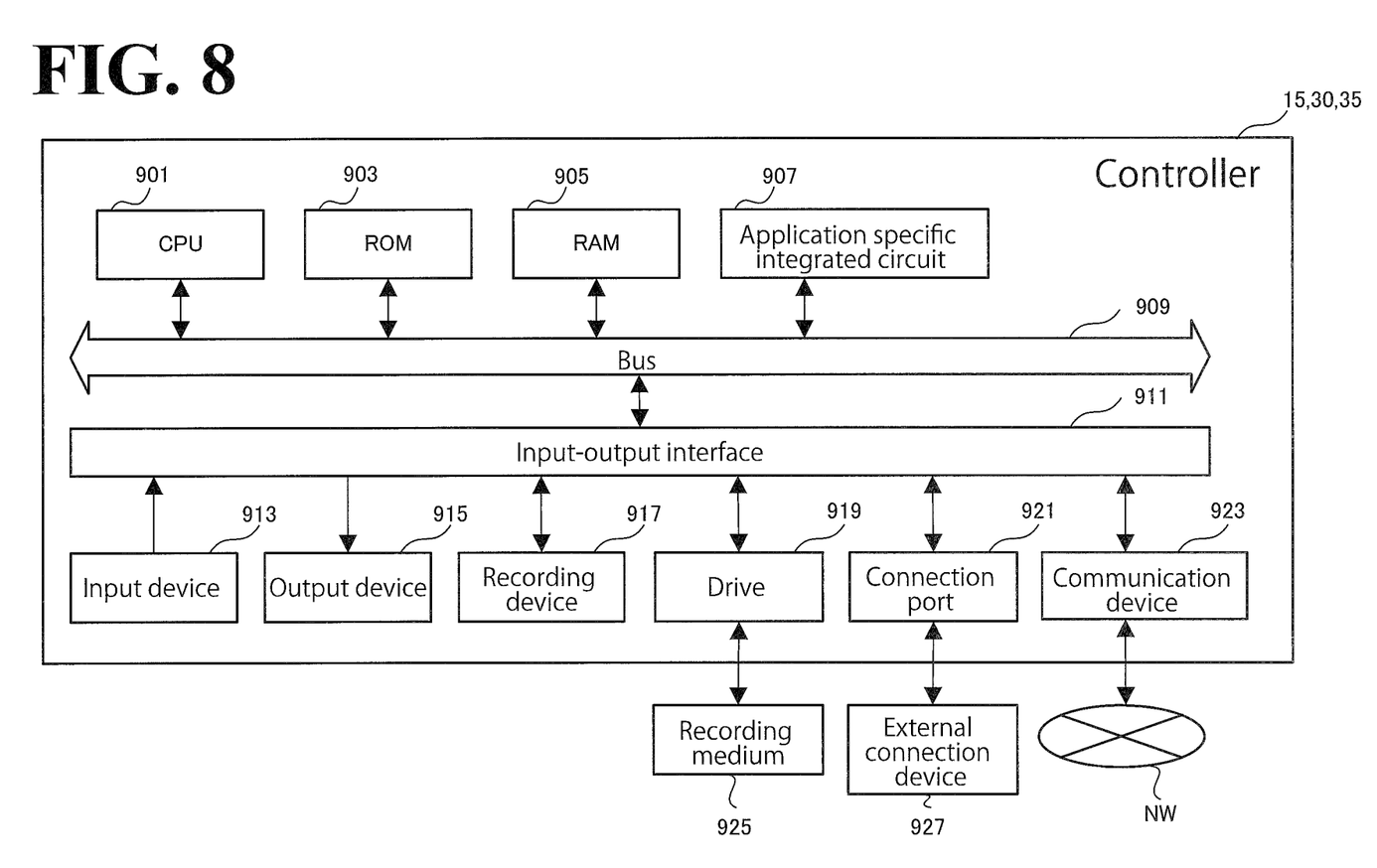
FIG. 8 is a diagram illustrating an example hardware configuration of the robot controller.

As illustrated in FIG. 8, each of the controllers 15, 30, and 35 includes the CPU 901, a ROM 903, a RAM 905, an application specific integrated circuit 907, an input device 913, an output device 915, a recording device 917, a drive 919, a connection port 921, and a communication device 923. Examples of the application specific integrated circuit 907 include, but are not limited to, an application specific integrated circuit (ASIC) and a field-programmable gate array (FPGA). These configurations are connected to each other through a bus 909 and an input-output interface 911 so that signals are transmittable to and from the configurations.

The programs may be stored in, for example, the ROM 903, the RAM 905, or the recording device 917. The recording device 917, a non-limiting example of which is a hard disc, serves as a storage, for example.

In another possible embodiment, the programs may be stored in a removable recording medium 925 temporarily or permanently. Examples of the recording medium 925 include, but are not limited to, a magnetic disc such as a flexible disc; an optical disc such as a compact disc (CD), a magneto-optical (MO) disc, and a digital video disc (DVD); and a semiconductor memory. The recording medium 925 may be provided in the form of "packaged software". In this case, the programs stored in the recording medium 925 may be read by the drive 919 and stored in the recording device 917 through devices such as the input-output interface 911 and the bus 909.

In still another possible embodiment, the programs may be stored in a download site or any other recording device such as a computer (not illustrated). In this case, the programs are transmitted to the communication device 923 through a network NW. Examples of the network NW include, but are not limited to, a local area network (LAN) and the Internet. Then, the programs received by the communication device 923 are stored in the recording device 917 through devices such as the input-output interface 911 and the bus 909.

In still another possible embodiment, the programs may be stored in an external connection device 927. In this case, the programs are transmitted through the connection port 921 and stored in the recording device 917 through devices such as the input-output interface 911 and the bus 909.

Then, the CPU 901 performs various kinds of processing based on the programs stored in the recording device 917 so as to implement the processings performed at the elements such as the distance determination part 33, the teaching data correction part 38, and the motion control part 16. In executing the programs, the CPU 901 may read the programs directly from the recording device 917 or may temporarily load the programs in the RAM 905. When the CPU 901 receives the programs through devices such as the communication device 923, the drive 919, and the connection port 921, the CPU 901 may execute the programs without storing the programs in the recording device 917.

As necessary, the CPU 901 may perform the various kinds of processing based on signals or information input through the input device 913, such as a mouse, a keyboard, and a microphone (not illustrated).

Then, the CPU 901 may output results of the processings from the output device 915, such as a display device and a sound output device. As necessary, the CPU 901 may transmit results of the processings through the communication device 923 and the connection port 921 and store the results of the processings in the recording device 917 and/or the recording medium 925.

As used herein, the terms "perpendicular", "parallel", and "plane" may not necessarily mean "perpendicular", "parallel", and "plane", respectively, in a strict sense. Specifically, the terms "perpendicular", "parallel", and "plane" mean "approximately perpendicular", "approximately parallel to", and "approximately plane", respectively, with design-related and production-related tolerance and error taken into consideration.

Also, when the terms "identical", "same", "equivalent", and "different" are used in the context of dimensions, magnitudes, sizes, or positions, these terms may not necessarily mean "identical", "same", "equivalent", and "different", respectively, in a strict sense. Specifically, the terms "identical", "same", "equivalent", and "different" mean "approximately identical", "approximately same", "approximately equivalent", and "approximately different", respectively, with design-related and production-related tolerance and error taken into consideration.

Otherwise, the above-described embodiment and modification may be combined in any manner deemed suitable.

While in the above-described embodiment a single circuit is used to serve as the processing parts of the movable object controller 30, this configuration is not intended in a limiting sense; it is also possible to use a plurality of circuits to perform the respective processing parts of the movable object controller 30. While in the above-described embodiment a single circuit is used to serve as the processing parts of the camera controller 35, this configuration is not intended in a limiting sense; it is also possible to use a plurality of circuits to perform the respective processing parts of the camera controller 35. While in the above-described embodiment a single circuit is used to serve as the processing parts of the robot controller 15, this configuration is not intended in a limiting sense; it is also possible to use a plurality of circuits to perform the respective processing parts of the robot controller 15.

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. A robot system comprising:
   a robot;
   a first movable object on which the robot is mounted and which is configured to move with the robot;
   a camera mounted on the first movable object to take, while the first movable object is moving, a plurality of images of a reference object that relates to a position of a workpiece; and
   circuitry configured to control the robot to operate on the workpiece based on the plurality of images while the first movable object is moving, wherein the circuitry is configured to
   store a stationary teaching data in which the first movable object is in a stationary state, calculate a position and moving speed of the first movable object with respect to the reference object based on the plurality of images of the reference object, correct the stationary teaching data to obtain a corrected teaching data based on the position and the moving speed, and control the robot to operate on the workpiece based on the corrected teaching data.

2. The robot system according to claim 1,
wherein the circuitry is configured to
obtain reference position information of the reference object, obtain current position information of the first movable object, determine, based on the reference position information and the current position information, whether a distance between a reference position of the reference object and a current position of the first movable object is equal to or less than a threshold, and obtain the plurality of images when the distance is determined to be equal to or less than the threshold.

3. The robot system according to claim 1, wherein the circuitry is configured to calculate, based on the plurality of images, a relative movement velocity vector of the reference object with respect to the first movable object, and correct the teaching data based on the relative movement velocity vector.

4. The robot system according to claim 1, wherein the circuitry is configured to obtain the plurality of images successively.

5. The robot system according to claim 1, further comprising:

a second movable object on which the workpiece and the reference object are provided and which is configured to move with the workpiece and the reference object, wherein the camera is configured to take the plurality of images of the reference object while the first movable object and the second movable object are moving, and wherein the circuitry is configured to control the robot to operate on the workpiece while the first movable object and the second movable object are moving.

6. A method for controlling a robot system, comprising:

moving a first movable object on which a robot and a camera are mounted;

taking, with the camera, a plurality of images of a reference object that relates to a position of a workpiece while the first movable object is moving;

storing a stationary teaching data in which the first movable object is in a stationary state;

calculating a position and moving speed of the first movable object with respect to the reference object based on the plurality of images of the reference object;

correcting the stationary teaching data to obtain a corrected teaching data based on the position and the moving speed; and controlling the robot to operate on the workpiece based on the corrected teaching data while the first movable object is moving.

7. The robot system according to claim 2,
wherein the circuitry is configured to
correct, based on an analysis of the plurality of images, a teaching data according to which the robot is configured to be operated, and control the robot based on the teaching data corrected.

8. The robot system according to claim 7, wherein the circuitry is configured to calculate, based on the plurality of images, a relative movement velocity vector of the reference object with respect to the first movable object, and correct the teaching data based on the relative movement velocity vector.

9. The robot system according to claim 2, wherein the circuitry is configured to obtain the plurality of images successively.

10. The robot system according to claim 1, wherein the circuitry is configured to obtain the plurality of images successively.

11. The robot system according to claim 3, wherein the circuitry is configured to obtain the plurality of images successively.

12. The robot system according to claim 7, wherein the circuitry is configured to obtain the plurality of images successively.

13. The robot system according to claim 8, wherein the circuitry is configured to obtain the plurality of images successively.

14. The robot system according to claim 2, further comprising:

a second movable object on which the workpiece and the reference object are provided and which is configured to move with the workpiece and the reference object, wherein the camera is configured to take the plurality of images of the reference object while the first movable object and the second movable object are moving, and wherein the circuitry is configured to control the robot to operate on the workpiece while the first movable object and the second movable object are moving.

15. The robot system according to claim 1, further comprising:

a second movable object on which the workpiece and the reference object are provided and which is configured to move with the workpiece and the reference object, wherein the camera is configured to take the plurality of images of the reference object while the first movable object and the second movable object are moving, and wherein the circuitry is configured to control the robot to operate on the workpiece while the first movable object and the second movable object are moving.

16. The robot system according to claim 3, further comprising:

a second movable object on which the workpiece and the reference object are provided and which is configured to move with the workpiece and the reference object, wherein the camera is configured to take the plurality of images of the reference object while the first movable object and the second movable object are moving, and wherein the circuitry is configured to control the robot to operate on the workpiece while the first movable object and the second movable object are moving.

17. The robot system according to claim 4, further comprising:

a second movable object on which the workpiece and the reference object are provided and which is configured to move with the workpiece and the reference object, wherein the camera is configured to take the plurality of images of the reference object while the first movable object and the second movable object are moving, and wherein the circuitry is configured to control the robot to operate on the workpiece while the first movable object and the second movable object are moving.

18. The robot system according to claim 7, further comprising:
a second movable object on which the workpiece and the reference object are provided and which is configured to move with the workpiece and the reference object,
wherein the camera is configured to take the plurality of images of the reference object while the first movable object and the second movable object are moving, and
wherein the circuitry is configured to control the robot to operate on the workpiece while the first movable object and the second movable object are moving.

19. The robot system according to claim 8, further comprising:
a second movable object on which the workpiece and the reference object are provided and which is configured to move with the workpiece and the reference object,
wherein the camera is configured to take the plurality of images of the reference object while the first movable object and the second movable object are moving, and
wherein the circuitry is configured to control the robot to operate on the workpiece while the first movable object and the second movable object are moving.

20. The robot system according to claim 1, wherein the circuitry is configured to relatively move the robot to operate on the workpiece with respect to the first movable object while the first movable object is moving.

* * * * *